(12) United States Patent
Zhu et al.

(10) Patent No.: US 12,302,770 B2
(45) Date of Patent: *May 20, 2025

(54) GARDEN TOOL SYSTEM, GARDEN TOOL AND ADJUSTING DEVICE THEREOF

(71) Applicant: Greenworks (Jiangsu) Co., Ltd, Jiangsu (CN)

(72) Inventors: Fei Zhu, Jiangsu (CN); Qunli Wei, Jiangsu (CN); Shengwen Zhang, Jiangsu (CN); Dongdong Shi, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,640

(22) Filed: May 7, 2024

(65) Prior Publication Data

US 2024/0284817 A1    Aug. 29, 2024

Related U.S. Application Data

(63) Continuation of application No. 17/024,069, filed on Sep. 17, 2020, now Pat. No. 12,004,438.

(30) Foreign Application Priority Data

Sep. 17, 2019    (CN) .......................... 201910874494.9

(51) Int. Cl.
*A01B 63/00*    (2006.01)
*A01B 49/04*    (2006.01)
(Continued)

(52) U.S. Cl.
CPC ............ *A01B 63/008* (2013.01); *A01B 49/04* (2013.01); *A01B 63/02* (2013.01); *A01D 34/74* (2013.01); *G05G 1/44* (2013.01); *G05G 5/06* (2013.01); *G05G 7/00* (2013.01); *A01D 42/00* (2013.01); *A01D 2101/00* (2013.01); *E01H 5/08* (2013.01)

(58) Field of Classification Search
CPC ....... A01B 63/008; A01B 63/02; A01B 49/04; G05G 1/44; G05G 5/06; G05G 7/00; A01D 34/74; A01D 34/64
See application file for complete search history.

(56) References Cited

U.S. PATENT DOCUMENTS

| | | | | | |
|---|---|---|---|---|---|
| 4,120,136 | A | * | 10/1978 | Rose ...................... | A01D 34/64 56/15.8 |
| 5,351,467 | A | * | 10/1994 | Trefz ..................... | A01D 34/74 56/16.3 |

(Continued)

*Primary Examiner* — Abigail A Risic (57) ABSTRACT

An adjusting device includes a lifting device for adjusting a position of an attachment in use and a locking mechanism. The lifting device is switched between a locking position and a free position under a locking action of the locking mechanism, the lifting device drives the attachment to move to a first position when the lifting device is in the locking position; and the lifting device drives the attachment to move to a second position so as to work when the lifting device is in the free position. The adjusting device has a simple structure, a low production cost, an easy maintenance, and a garden tool using the adjusting device can conveniently and quickly adjust the position of the attachment connected to the garden tool.

16 Claims, 7 Drawing Sheets

(51) Int. Cl.
  *A01B 63/02* (2006.01)
  *A01D 34/74* (2006.01)
  *A01D 42/00* (2006.01)
  *E01H 5/08* (2006.01)
  *G05G 1/44* (2008.04)
  *G05G 5/06* (2006.01)
  *G05G 7/00* (2006.01)
  *A01D 101/00* (2006.01)

(56) References Cited

U.S. PATENT DOCUMENTS

| | | | | |
|---|---|---|---|---|
| 7,540,135 B2* | 6/2009 | Strope | ............ | A01D 34/661 56/14.9 |
| 11,071,248 B1* | 7/2021 | Funk | ............ | A01D 34/661 |
| 2008/0229725 A1* | 9/2008 | Shaffer | ............ | A01D 34/74 56/17.1 |
| 2014/0250851 A1* | 9/2014 | Jonsson | ............ | A01D 34/81 56/320.1 |
| 2014/0260161 A1* | 9/2014 | Lancaster | ............ | A01D 34/74 56/17.1 |
| 2015/0232071 A1* | 8/2015 | Pelletier | ............ | B60W 10/18 477/194 |
| 2016/0311458 A1* | 10/2016 | Oswald | ............ | A01D 42/00 |
| 2016/0375943 A1* | 12/2016 | Pugh | ............ | B62D 49/04 280/43 |
| 2019/0133035 A1* | 5/2019 | Hoffman | ............ | A01D 34/64 |
| 2019/0183043 A1* | 6/2019 | Lapp | ............ | A01D 34/74 |
| 2019/0216016 A1* | 7/2019 | Hoppel | ............ | A01D 42/08 |
| 2019/0289783 A1* | 9/2019 | Welz | ............ | A01D 34/74 |
| 2020/0329637 A1* | 10/2020 | Clontz | ............ | A01D 34/661 |
| 2021/0076566 A1* | 3/2021 | Wei | ............ | A01D 34/74 |
| 2022/0306055 A1* | 9/2022 | Biba | ............ | G05G 5/03 |
| 2023/0172103 A1* | 6/2023 | Lardieri | ............ | A01D 34/74 56/17.1 |

* cited by examiner

GARDEN TOOL SYSTEM, GARDEN TOOL AND ADJUSTING DEVICE THEREOF

CROSS-REFERENCE TO RELATED INVENTIONS

This invention is a continuation application of U.S. patent application Ser. No. 17/024,069 filed on Sep. 17, 2020. U.S. Ser. No. 17/024,069 is based on, and claims the priority from, Chinese application number 201910874494.9, filed on Sep. 17, 2019, the disclosures of which is hereby incorporated by reference herein in its entirety for all purposes.

TECHNICAL FIELD

The invention relates to a garden tool having an adjusting device for adjusting the position of an attachment connected to the garden tool.

BACKGROUND ART

A garden tool usually has only a single function module, so that the use of the garden tool is limited by seasons, for example, a lawn mower is usually in an idle state in winter, that greatly reduces the usage rate of the garden tool.

In order to improve utilization rate of the garden tool, attachments which are able to be attached to the garden tool are developed, such as a snow thrower which is able to be attached to the lawn mower, so that the lawn mower can perform snow removing work in winter.

However, the attachment is required to adjust its position according to actual situation in use, so as to ensure its use effect. For example, the snow thrower needs to be closed to the ground to complete the garden work in use and it needs to be lifted for a long time when it needs to overcome obstacles. Hence, it is a focus in development and in use to provide an adjusting device which can conveniently and quickly adjust the position of the attachment.

In view of the above, it is desirable to provide an adjusting device to overcome the above problems.

SUMMARY OF INVENTION

The present invention provides an adjusting device which can conveniently and quickly adjust a use position of an attachment connected to the garden tool to improve the practicability of the garden tool.

To achieve the above object, the present invention adopts the following technical solution: a garden tool system, comprising: a garden tool; an attachment pivotally connected to the garden tool, the attachment having a first position and a second position; and an adjusting device located between the garden tool and the attachment and connected to the garden tool and the attachment, including: a lifting device connected to the attachment, operative to adjust the position of the attachment; and a locking mechanism including: a fixing portion connected to the garden tool; and a locking portion, rotatably connected with the fixing portion; wherein the locking portion is engaging with the lifting device when the attachment is in the first position.

As a further improvement of the invention, the lifting device comprises a pedal assembly rotatably connected to the attachment, and a connecting portion connected to the pedal portion and the attachment.

As a further improvement of the invention, the pedal assembly is provided with a holding member for engaging with the locking portion.

As a further improvement of the invention, the pedal assembly comprises a pedal body and a pedal bracket connected to the pedal body, the holding member is arranged on the pedal bracket.

As a further improvement of the invention, the connecting portion comprises a pulling rod and a first rotating assembly, the first rotating assembly is connected to the pedal bracket, one end of the pulling rod is adjustably connected to the first rotating assembly and the other end is connected to the attachment.

As a further improvement of the invention, the pedal bracket is provided with a U-shaped arm at one end away from the pedal body, the first rotating assembly is connected to the U-shaped arm.

As a further improvement of the invention, the first rotating assembly comprises two first pressing plate assemblies and a first rotating shaft rotatably assembled between the two first pressing plate assemblies, one end of the pulling rod is rotatably connected to the attachment, and the other end of the pulling rod penetrates through the first rotating shaft.

As a further improvement of the invention, the locking portion is provided with a holding protrusion for engaging with the lifting device.

As a further improvement of the invention, the holding protrusion and the locking portion are integrally formed.

As a further improvement of the invention, the locking portion is provided with a toggle structure for separating the locking portion from the lifting device.

As a further improvement of the invention, the locking mechanism further comprises a reset mechanism, two ends of the reset mechanism connected to the fixing portion and the locking portion respectively.

As a further improvement of the invention, the locking portion is located beside the pedal assembly, and the toggle structure is formed by the one end of the locking portion away from the fixing portion and the toggle structure extends toward the pedal assembly.

As a further improvement of the invention, the toggle structure extends beyond the upper surface of the pedal body.

As a further improvement of the invention, the fixing portion and the locking portion are both provided with a positioning protrusion, two ends of the reset mechanism connected to the positioning protrusion disposed on the fixing portion and the locking portion respectively.

As a further improvement of the invention, the reset mechanism is a reset spring.

As a further improvement of the invention, the adjusting device further comprises an assisting mechanism, the assisting mechanism is provided with a retaining portion and a boosting portion, one end of the boosting portion is connected to the retaining portion, and the other end of the boosting portion is connected to the attachment.

As a further improvement of the invention, the boosting portion comprises a linking rod and an elastic booster connected to the linking rod, the linking rod is adjustable connected to the retaining portion.

As a further improvement of the invention, the retaining portion comprises two second pressing plate assemblies and a second rotating shaft rotatably secured between the two second pressing plate assemblies, one end of the boosting portion connects to the second rotating shaft, and the other end of the boosting portion connects to the attachment.

To achieve the above object, the present invention also adopts the following technical solution: a garden tool, comprising: a frame; an attachment pivotally connected to the frame, the attachment having a first position and a second position; and an adjusting device located between the garden tool and the attachment and connected to the frame and the attachment, including: a lifting device connected to the attachment, operative to adjust the position of the attachment; and a locking mechanism including: a fixing portion connected to the garden tool; and a locking portion, rotatably connected with the fixing portion; wherein the locking portion is engaging with the lifting device when the attachment is in the first position.

To achieve the above object, the present invention also adopts the following technical solution: an adjusting device of a garden tool, comprising: a fixing portion connected to the garden tool; a locking portion rotatably connected with the fixing portion; and a lifting device connected to the garden tool, the lifting device having a locking position and a free position; wherein the lifting device engages with the locking portion when the lifting device is in the locking position.

The above general description and the following detailed description are intended to be illustrative and not restrictive.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with the present invention. On the contrary, they are only examples of devices, systems, machines and methods consistent with some aspects of the invention as detailed in the appended claims.

Figure 1:
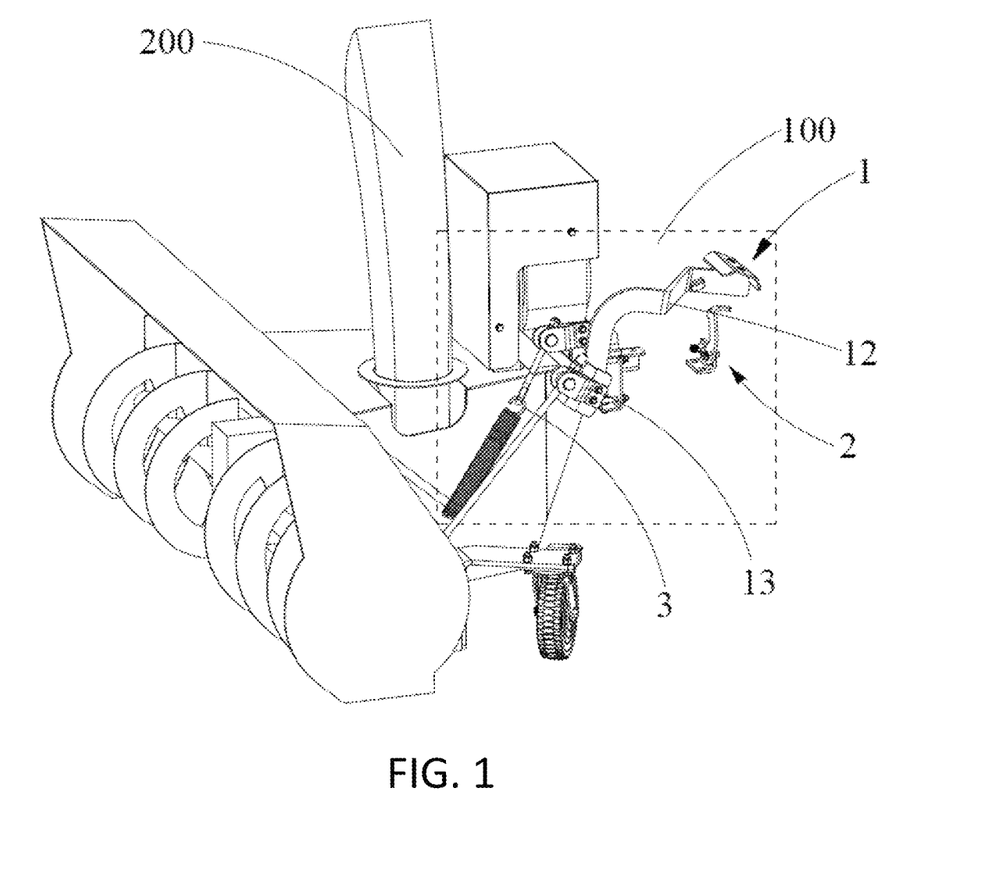
FIG. 1 is a perspective view of an adjusting device mounted with the attachment according to one embodiment of the present invention.
Figure 8:
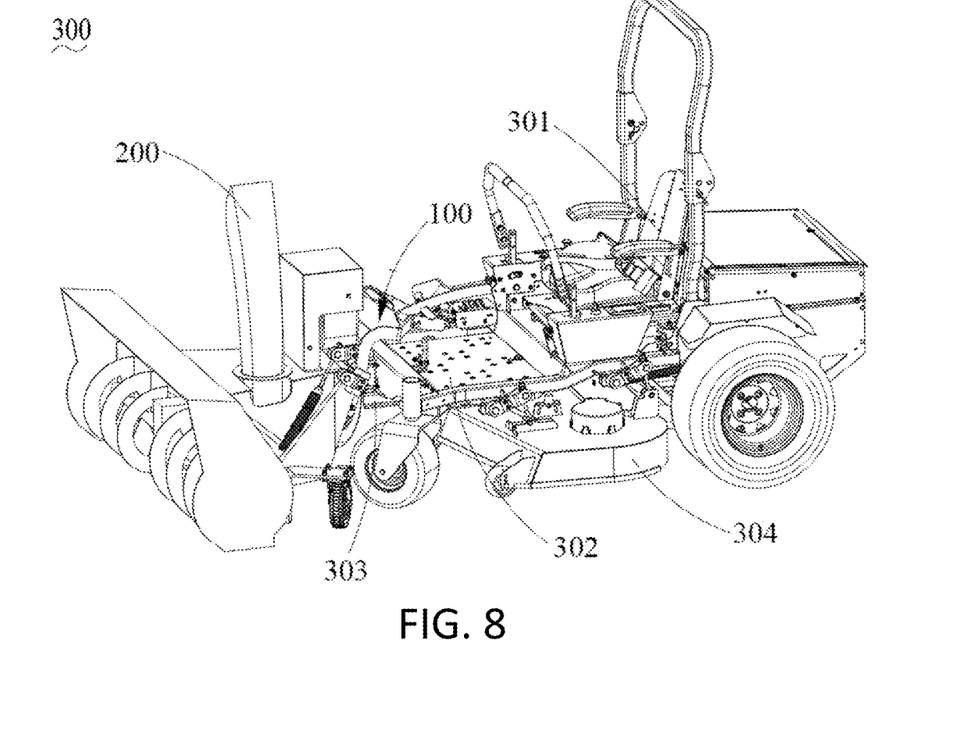
FIG. 8 is a perspective view of a garden tool according to present invention.

Referring to FIG. 1 and FIG. 8, an adjusting device 100 adapted for a garden tool 300 is shown. The adjusting device 100 comprises a lifting device 1 for lifting the attachment 200 in vertical direction and a locking mechanism 2 locking with the lifting device 1.

Figure 2:
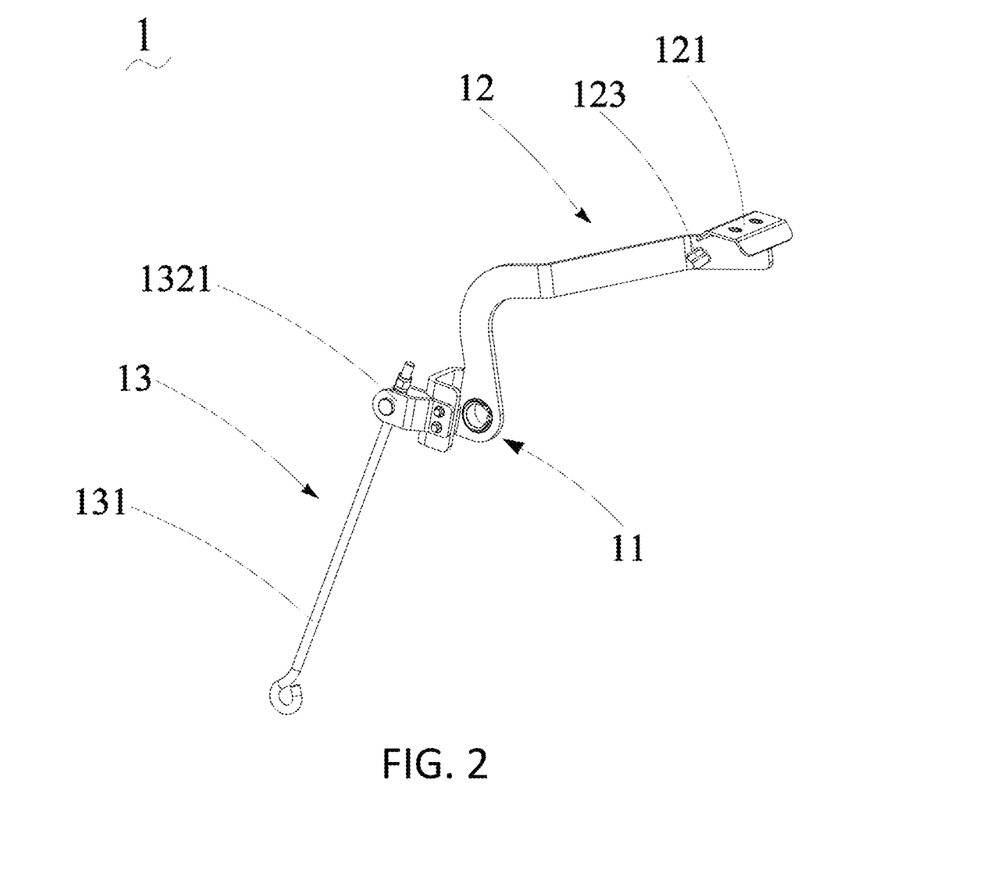
FIG. 2 is a perspective view of a lifting device of the adjusting device shown in FIG. 1.

Referring to FIG. 2 in conjunction with FIG. 1, the lifting device 1 comprises a shaft assembly 11, a pedal assembly 12 rotatably mounted to the shaft assembly 11 and a connecting portion 13 for rotatably connecting the pedal assembly 12 and the attachment 200. When step the pedal assembly 12, the pedal assembly 12 rotates around the shaft assembly 11 and drives the connecting portion 13 to move upwardly, thereby lifting the attachment 200 to move upwardly. In a preferred embodiment of the present invention, the shaft assembly 11 comprises a connecting shaft (not shown), a positioning bearing 111 and a snap spring 112 mounted to the connecting shaft. The pedal assembly 12 is fixedly connected to the positioning bearing 111 and locked by the snap spring 112, so that on the one hand the pedal assembly 12 can rotate around the connecting shaft; on the other hand, the lateral movement of the pedal assembly 12 relative to the shaft is prevented and a stable connection between the pedal assembly 12 and the shaft assembly 11 is achieved.

Figure 3:
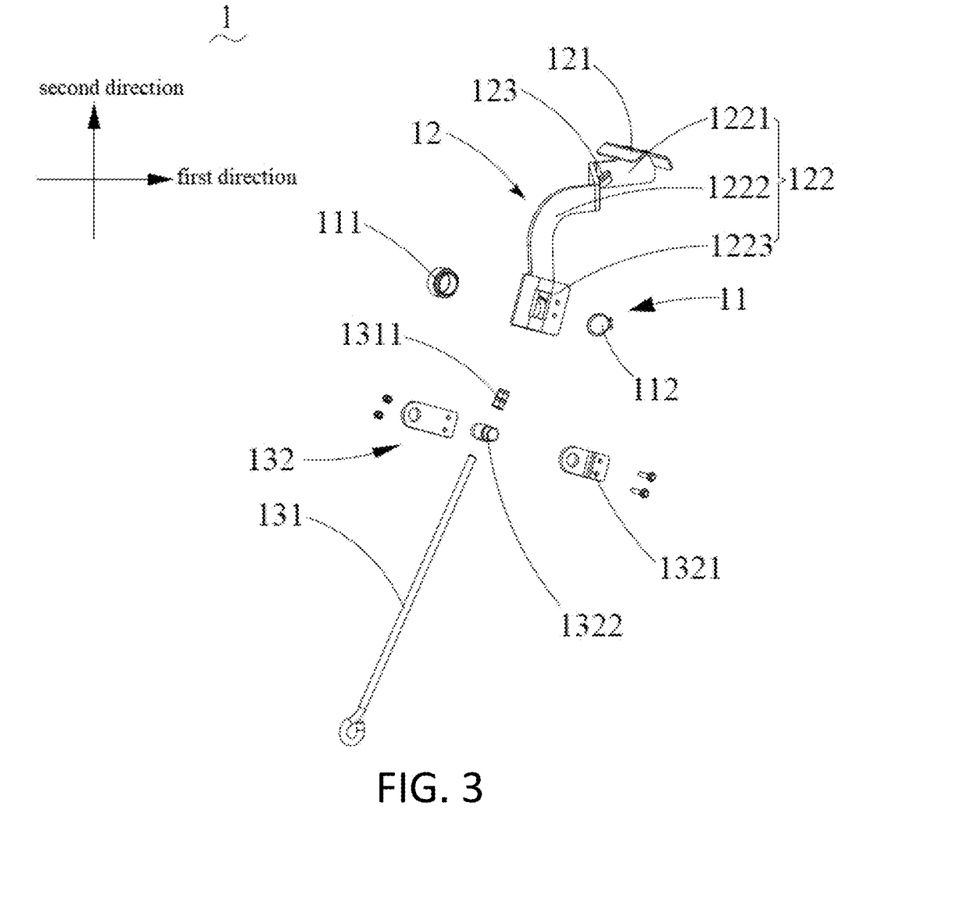
FIG. 3 is an exploded view of a lifting device shown in FIG. 2.
Figure 4:
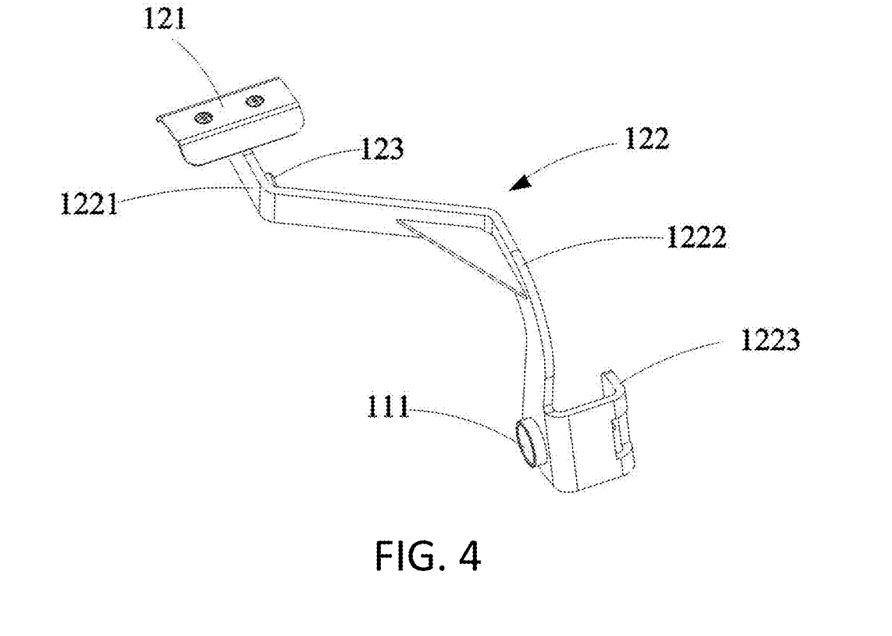
FIG. 4 is a perspective view of a pedal assembly of the lifting device shown in FIG. 3.

The pedal assembly 12 is configured to facilitate the operation of the adjusting device 100, and specifically, the pedal assembly 12 comprises a pedal body 121 and a pedal bracket 122 connected to the pedal body 121, in this embodiment, the pedal body 121 is substantially plate-shaped and obliquely connected to an end of the pedal bracket 122.

It should be noted that, in the drawings of this embodiment of present invention, only take the pedal body 121 as an example for illustration, that is, in other embodiments of the present invention, the specific shape of the pedal body 121 can be selected according to actual needs.

One end of the pedal bracket 122 is connected to the pedal body 121, and the other end of the pedal bracket 122 is rotatably mounted to the shaft assembly 11 to support the pedal body 121, the connecting portion 13 is connected to the pedal bracket 122, so that the connecting portion 13 can move under a cooperation of the pedal body 121 and the pedal bracket 122, and further drive the attachment 200 connected to the connecting portion 13 to switch between a first position and a second position.

In a preferred embodiment of the present invention, the pedal bracket 122 has an extending arm 1221 for connecting to the pedal body 121, a cantilever 1222 connected to an end of the extending arm 1221 away from the pedal body 121, and a U-shaped arm 1223 connected to an end of the cantilever 1222 away from the pedal body 121. An extending direction of the pedal assembly 12 in a horizontal plane is defined as a first direction, and an extending direction of the pedal assembly 12 in a vertical direction perpendicular to the horizontal plane is defined as a second direction, then the extending arm 1221 is used for increasing an extending length of the pedal bracket 122 in the first direction to increase a rotating moment arm of the pedal assembly 12, so that the pedal body 121 is conveniently stepped with a small force to drive the connecting portion 13 to move upwardly and further pull the attachment 200 to move upwardly.

Furthermore, the cantilever 1222 is used to increase the extending length of the pedal bracket 122 both in the first direction and the second direction, by such arrangement, the moment arm of the pedal portion 12 for pulling the connecting portion 13 is increased on the one hand, and a moving distance of the pedal assembly 12 in the second direction is increased on the other hand, thus a displacement height of the attachment 200 in the second direction (that is a distance between the first position and the second position) is effectively increased.

It should be noted that, in the present embodiment, the extending arm 1221 and the cantilever 1222 are two separate structures that are separately disposed and then connected by welding, but in other embodiments of the present invention, the extending arm 1221 may be formed by extending the cantilever 1222 in the first direction, and in this case, the extending arm 1221 and the cantilever 1222 are integrally formed.

The U-shaped arm 1223 is connected to an end of the cantilever 1222 away from the pedal body 121 for connecting the shaft assembly 11 and the connecting portion 13. Specifically, the shaft assembly 11 and the connecting portion 13 are respectively connected to two opposite walls of the U-shaped arm 1223, by such arrangement, the pedal bracket 122 can rotate around the connecting shaft of the shaft assembly 11 on the one hand; the shaft assembly 11 and the connecting portion 13 are avoided to be simultaneously connected to adjacent positions on the pedal bracket 122 so as to ensure a use strength and a service life of the pedal bracket 122.

The connecting portion 13 is used for connecting the lifting device 1 and the attachment 200, and in this embodiment, the connecting portion 13 is provided with a pulling rod 131 and a first rotating assembly 132 for connecting the pulling rod 131 and the pedal assembly 12. Specifically, the first rotating assembly 132 has two first pressing plate assemblies 1321 and a first rotating shaft 1322 rotatably assembled between the two first pressing plate assemblies 1321, one end of the pulling rod 131 is rotatably connected to the attachment 200 via a sleeve (not shown), and the other end of the pulling rod 131 penetrates through the first rotating shaft 1322 and is connected and positioned to the first rotating assembly 132 by a fastening member 1311.

Furthermore, a length of the pulling rod 131 penetrating through the first rotating shaft 1322 is adjustable, by such arrangement, the first position of the attachment 200 connected to the pulling rod 131 can be adjusted by adjusting the penetrating length of the pulling rod 131, so that it is convenient to integrally adjust the position of the attachment 200 so as to improve using convenience of the adjusting device 100. Preferably, a fastening thread is provided at an end of the pulling rod 131 penetrating the first rotating shaft 1322, and the fastening member 1311 is a nut corresponding to the fastening thread.

Figure 5:
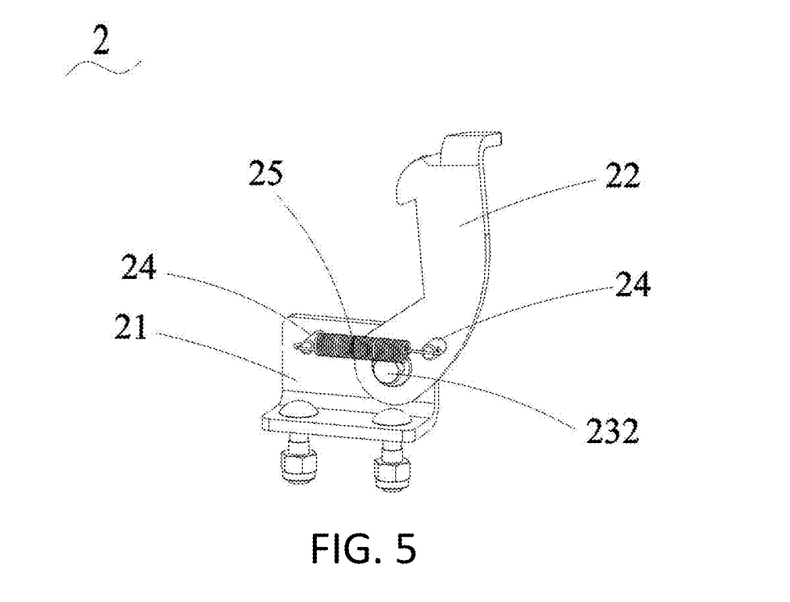
FIG. 5 is a perspective view of a locking mechanism shown in FIG. 1.
Figure 6:
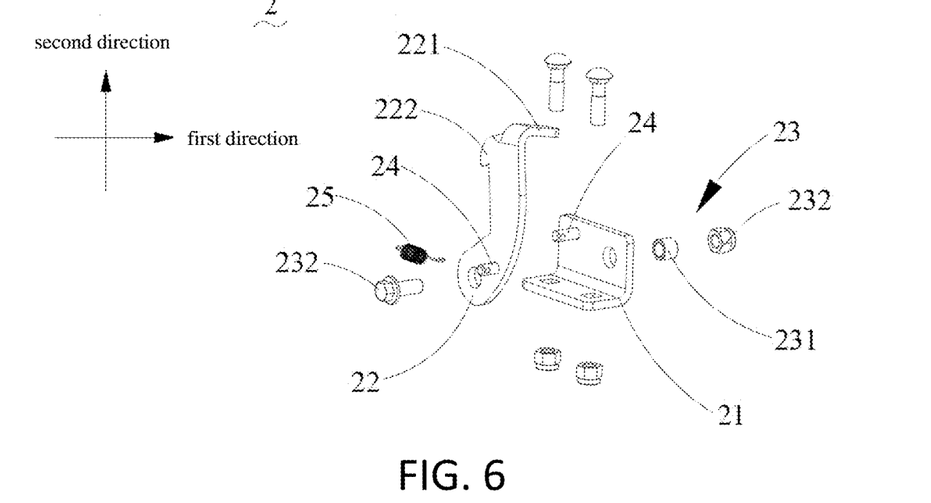
FIG. 6 is an exploded view of a latching mechanism shown in FIG. 5.

Referring to FIG. 1, FIG. 5 and FIG. 6, the locking mechanism 2 is used for defining a locking position of the lifting device 1, and has a fixing portion 21, a locking portion 22, and a reset mechanism 25 connecting the fixing portion 21 and the locking portion 22. The fixing portion 21 is used for fixing an installation position of the locking mechanism 2, one end of the locking portion 22 is rotatably connected with the fixing portion 21, and the other end of the locking portion 22 is provided with a toggle structure 221 for separating the locking mechanism 2 from the pedal assembly 12.

Specifically, the locking mechanism 2 further has a bush assembly 23 rotatably connecting the fixing portion 21 and the locking portion 22, the bush assembly 23 has a main body 231 and a locking member 232, furthermore, the fixing portion 21 and the locking portion 22 are further provided with through holes (not numbered) corresponding to the main body 231, the main body 231 penetrates through the fixing portion 21 and the locking portion 22 via the through holes, and the locking member 232 penetrates through the main body 231 and abuts against both sides of the fixing portion 21 and the locking portion 22, so that the locking portion 22 can rotate around an axis of the main body 231, and at the same time, the locking portion 22 and the fixing portion 21 are prevented from being separated from each other, thereby ensuring the stability of connection and installation of the locking mechanism 2. Preferably, locking member 232 is a bolt assembly.

The toggle structure 221 is disposed on an end of the locking portion 22 away from the fixing portion 21, in a preferred embodiment of the present invention, the locking portion 22 is disposed in a plate shape and located beside the pedal assembly 12, the toggle structure 221 is formed by bending and extending from a side of the locking portion 22 toward the lifting device 1, and when the lifting device 1 is located at the locking position, the toggle structure 221 is disposed beyond an upper surface of the pedal body 121 from a side edge of the pedal body 121, so that an operator can separate the toggle structure 221 and the pedal body 121 by toggling the toggle structure 221, thereby effectively improving the convenience of the adjusting device 100.

Furthermore, the locking portion 22 is further provided with a holding protrusion 222, the pedal assembly 12 is provided with a holding member 123 corresponding to the holding protrusion 222, and the locking mechanism 2 controls the lifting device 1 to be positioned at the locking position by the cooperation of the holding protrusion 222 and the holding member 123. Specifically, the holding protrusion 222 is provided on the locking portion 22 and extends toward the pedal assembly 12, and the holding member 123 is provided on a side of the pedal assembly 12 adjacent to the locking portion 22.

In a preferred embodiment of the present invention, the locking portion 22 is located between the pedal body 121 and the shaft assembly 11, the holding member 123 is disposed on one side of the extending arm 1221 adjacent to the locking portion 22, and the holding protrusion 222 and the locking portion 22 are integrally formed, so as to ensure a stable engagement between the holding protrusion 222 and the holding member 123, reduce an occupied space when the lifting device 1 and the locking mechanism 2 are combined, facilitate an assembly of the adjusting device 100, and achieve a purpose of improving the practicability of the adjusting device 100.

In another preferred embodiment of the present invention, the toggle structure 221 extends beyond the upper surface of the pedal body 121 from a side edge of the pedal body 121 and extends along the upper surface of the pedal body 121, so that when the lifting device 1 is in the locking position and the holding protrusion 222 latches the holding member 123, the toggle structure 221 also latches the edge of the pedal body 121 to help limit the lifting device 1 in the locking position, so as to ensure the stability of the engagement between the lifting device 1 and the locking mechanism 2, and improve the safety of the adjusting device 100.

In another preferred embodiment of the present invention, the pedal assembly 12 can also be provided without the holding member 123, in this embodiment, the toggle structure 221 latches the side edge of the pedal body 121.

The reset mechanism 25 is used for returning the connection fixing portion 21 and the locking portion 22, specifically, the locking portion 22 is rotatable towards a side away from the pedal bracket 122 under the urging action of the pedal assembly 12, and catches the pedal assembly 12 or returns to the initial position under the returning action of the reset mechanism 25. The fixing portion 21 and the locking portion 22 are both provided with a positioning protrusion 24 for connecting and fixing the reset mechanism 25, two ends of the reset mechanism 25 fix to the positioning protrusion 24 disposed on the fixing portion 21 and the locking portion 22 respectively, so that locking portion 22 can return to the initial position or latch with the pedal assembly 12 in time under an action of the reset mechanism 25, furthermore, the positioning protrusion 24 of the fixing portion 21 can limit the locking portion 22 to avoid the locking portion 22 from excessively rotating towards a side towards of pedal bracket 122, and ensure use stability of the adjusting device 100.

In a preferred embodiment of the present invention, the reset mechanism 25 is a reset spring, but in other embodiments of the present invention, the reset mechanism 25 may also be a reset mechanism having a reset function, such as a hydraulic elastic rod, i.e., the reset spring is taken as the reset mechanism 25 for illustration only, and should not be taken as a limitation.

Figure 7:
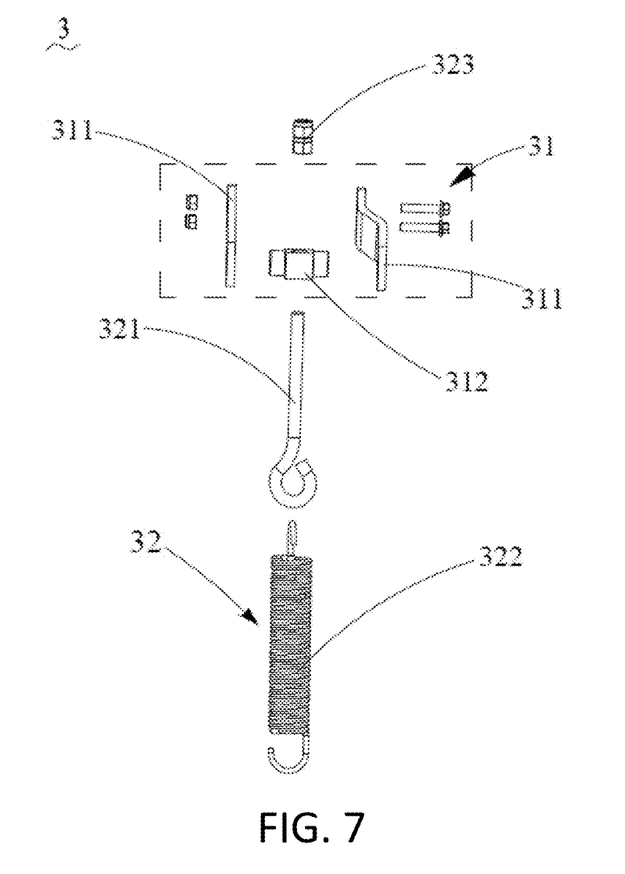
FIG. 7 is an exploded view of an assisting mechanism in FIG. 1.

The adjusting device 100 is further provided with an assisting mechanism 3 which is arranged in a staggered manner with the lifting device 1, to elastically connect the attachment 200 and reduce a load-bearing tension of the lifting device 1 in use, this can further improve a use convenience of the adjusting device 100. As shown in FIG. 1 and FIG. 7, the assisting mechanism 3 has a retaining portion 31 and a boosting portion 32. The retaining portion 31 includes two second pressing plate assemblies 311 and a second rotating shaft 312 rotatably secured between the two second pressing plate assemblies 311. One end of the boosting portion 32 connects to the second rotating shaft 312, and the other end of the boosting portion 32 connects to the attachment 200.

The boosting portion 32 has a linking rod 321 and an elastic booster 322 connected to the linking rod 321, the linking rod 321 is used to connect the retaining portion 31 and the boosting portion 32. Specifically, one end of the linking rod 321 penetrates through the second rotating shaft 312 and is positioned with the second rotating shaft 312 via a locking member 323. A length of the linking rod 321 penetrating through the second rotating shaft 312 is adjustable, which facilitates to adjust an actual length of the assisting mechanism 3 according to the specific installation position of the adjusting device 100.

The elastic booster 322 is connected to an end of the linking rod 321 away from the second rotating shaft 312, and in a preferred embodiment of the present invention, the elastic booster 322 is a spring, and is provide hooks for connecting the linking rod 321 and the attachment 200 at two ends thereof, by such arrangement, it is facilitate to use different elastic booster 322 in different types according to a weight of the attachment 200 and a distance between the adjusting device 100 and the attachment 200.

It should be noted that, in the present invention, the elastic booster 322 is only taken as a spring and connects to the retaining portion 31 via the linking rod 321 for example, in other embodiments of the present invention, the elastic booster 322 may also be another structure that can elastically connects to the attachment 200 and reduce the load-bearing tension of the lifting device 1 in use. The linking rod 321 may also be another connecting structure for connecting the retaining portion 31 and the elastic booster 322, that is, the specific structures of the elastic booster 322 and the linking rod 321 mentioned in the description of the invention are only exemplary and should not be limited thereto.

When operate the adjusting device 100 of the present invention, step the pedal body 121 to control the pedal body 121 and the pedal bracket 122 to rotate about the connecting shaft of the shaft assembly 11, then the locking portion 22 is further pushed to rotate toward the side away from the pedal bracket 122. Continue to step the pedal body 121, the locking portion 22 drives the holding protrusion 222 disposed on the locking portion 22 to latch with the holding member 123 under the action of the reset mechanism 25. At that moment, the toggle structure 221 protrudes beyond (or protrudes beyond and latches) the edge of the pedal body 121, so as to lock the lifting device 1 at the locking position by the locking mechanism 2, and further position the attachment 200 at the first position, so that the attachment 200 stays in the lifted state for a long time, without the need to step on the pedal body 121 for a long time. When the attachment 200 is in the lifted state, the attachment 200 can be far away from the ground to easily overcome obstacles on the ground.

When the attachment 200 is required to return to the second position, the operator can do so by disengaging the locking mechanism 2, which latching with the lifting device 1. Specifically, when the attachment 200 returns to the second position, firstly, toggle the toggle structure 221 protruding from (or protruding from and latching with) the edge of the pedal body 121 to separate the locking portion 22 from the pedal assembly 12, and then the connection portion 13 pulls the pedal assembly 12 to rotate around the connecting shaft of the shaft assembly 11 under the action of the gravity of the attachment 200, till the lifting device 1 rotates from the locking position to a free position, and at that time, the attachment 200 returns to the second position, so that the attachment 200 can complete the subsequent use or movement.

Furthermore, the adjusting device 100 of the present invention can also selectively install the assisting mechanism 3 according to the self-gravity of the attachment 200. Specifically, the retaining portion 31 of the assisting mechanism 3 and the connecting portion 13 of the lifting device 1 is disposed in a staggered manner, so as to assist the lifting device 1 to share a pulling force when pulling the attachment 200 and the self-gravity of the attachment 200, and when the attachment 200 is located at the second position, the boosting portion 32 is in a stretching state to share the gravity of the attachment 200, so as to move the attachment 200 from the second position to the first position by conveniently stepping on the pedal assembly 12 with a small force. Furthermore, when the attachment 200 is in the first position, the boosting portion 32 is in a natural extension or tension state, so that the boosting portion 32 can assist the lifting device 1 to control the attachment 200 to slowly return to the second position from the first position, that can prevent the lifting device 1 from breaking under the tension action of the attachment 200, and ensure the safety of the adjusting device 100 of the present invention.

Figure 9:
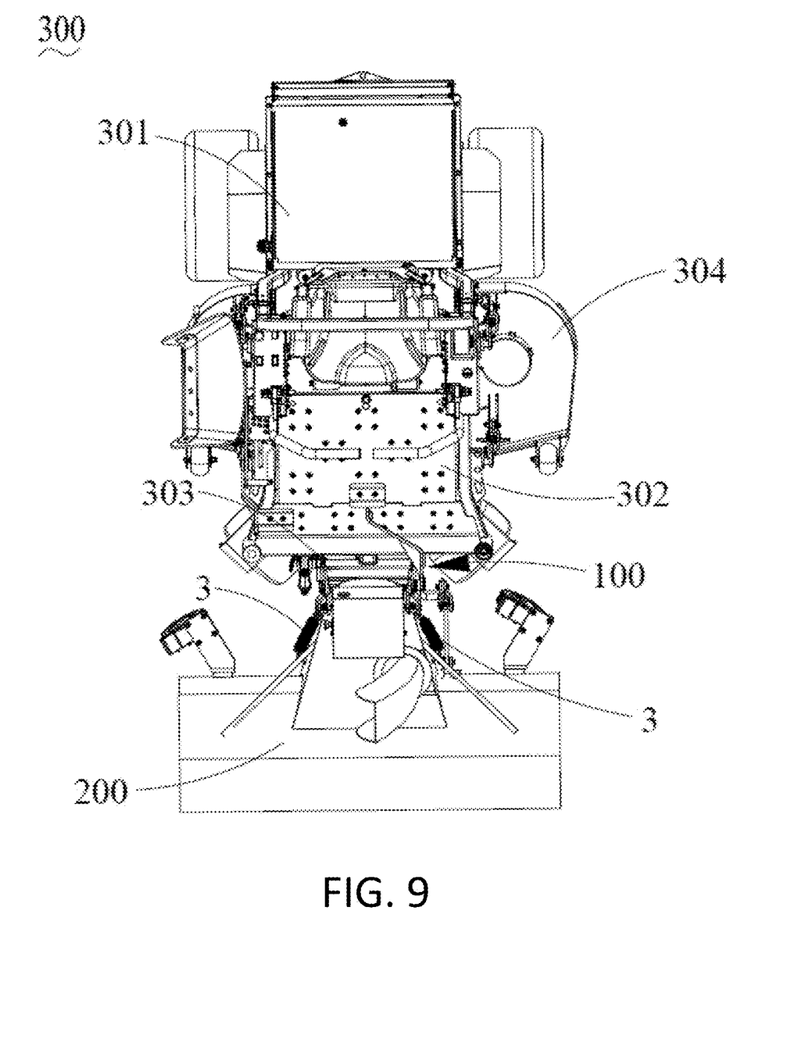
FIG. 9 is a top view of the garden tool in FIG. 8.

Referring to FIG. 8 and FIG. 9 in combination with FIG. 1 to FIG. 5, the garden tool 300 according to the present invention is shown. The garden tool 300 comprises a driving body 301, an attachment 200 detachably coupled to the driving body 301, and the adjusting device 100 for controlling the working position of the attachment 200.

The driving body 301 is provided with a frame 302 for attaching the attachment 200, and the attachment 200 and the adjusting device 100 are both located in front of the frame 302 in a forward direction of the driving body 301. Furthermore, the frame 302 is provided with a mounting mechanism 303 for connecting the driving body 301 and the attachment 200.

Specifically, the connecting shaft of the shaft assembly 11 is rotatably connected to the mounting mechanism 303, the lifting device 1 is connected to the mounting mechanism 303 via the connecting shaft, the attachment 200 is fixedly mounted to the connecting shaft, thereby the attachment 200 is connected to the frame 302 via the mounting mechanism 303. The locking mechanism 2 is fixed to the frame 302, and the locking portion 22 is disposed beside the pedal bracket 122 of the lifting device 1 and between the pedal body 121 and the shaft assembly 11, so as to ensure that the adjusting device 100 has a small size and facilitate the assembly and engagement of the adjusting device 100 with the driving body 301, on the basis of ensuring that the adjusting device 100 controls the working position of the attachment 200.

In a preferred embodiment of the present invention, the assisting mechanisms 3 are disposed in pairs, a plurality of assisting mechanisms 3 are symmetrically disposed on two sides of the mounting mechanism 303, and the retaining portion 31 of each assisting mechanism 3 is connected to the frame 302 or mounted to the mounting mechanism 303 for assisting the lifting device 1 to complete the position switching of the attachment 200. Of course, in other embodiments of the present invention, the assisting mechanism 3 may be provided independently or in a singular form, it is just needed to ensure the stability of the operation of the adjusting device 100.

Furthermore, the driving body 301 of the present invention is a mower having a grass cutting assembly 304 for performing grass cutting task, and the attachment 200 is a snow thrower for performing snow removing task, so that the garden tool 300 can perform grass cutting tasks in spring, summer, and in autumn and can also perform snow removing tasks in winter, thereby effectively improving the practicability of the garden tool 300, and simultaneously reducing the maintenance times of the garden tool 300 during non-use period and effectively reducing the maintenance cost of the garden tool 300.

Of course, in other embodiments of the present invention, the driving body 301 may also be other kinds of garden working components with garden working functions, and the garden working component may be a riding type garden working component or a walking type garden working component. Furthermore, the driving body 301 may also be other driving component without garden working functions, such as a tractor and other driving component capable of automatically or manually driving. Meanwhile, the attachment 200 may also be other garden working component for realizing garden working and having power, that is, the specific kinds and specific arrangement forms of the driving body 301 and the attachment 200 in the present invention may be selected according to actual needs, which is not limited thereto.

In summary, the adjusting device 100 of the present invention is provided with the locking mechanism 2 latching with the lifting device 1, so that the adjusting device 100 is switched between the locking position and the free position, and further controls the attachment 200 connected to the driving body 301 to be switched between the first position and the second position, so as to facilitate the transfer or the use of the attachment 200. That effectively improves the convenience of the garden tool 300 using the adjusting device 100. Furthermore, and the adjusting device 100 and the garden tool 300 has a simple structure and an assembly, that reduces the manufacturing cost and the maintenance cost of the adjusting device 100 and the garden tool 300 using the adjusting device 100.

The above embodiment is only used to illustrate the present invention and not to limits the technical solutions described in the present invention. The understanding of this specification should be based on those skilled in the art, although the present invention has been described in detail with reference to the above embodiment. However, those skilled in the art should understand that those skilled in the art can still modify or equivalently replace the present invention, and all technical solutions and improvements that do not depart from the spirit and scope of the present invention should be within the scope of the claims of the invention.

What is claimed is:

1. A garden tool system, comprising:
   a garden tool;
   an attachment pivotally connected to the garden tool, the attachment having a first position and a second position; and
   an adjusting device located between the garden tool and the attachment and connected to the garden tool and the attachment, including:
   a lifting device connected to the attachment, operative to adjust the position of the attachment; and
   a locking mechanism including:
   a fixing portion connected to the garden tool; and
   a locking portion, rotatably connected with the fixing portion;
   wherein the locking portion is engaging with the lifting device when the attachment is in the first position;
   wherein the lifting device comprises a pedal assembly rotatably connected to the attachment, and a connecting portion connected to the pedal assembly and the attachment;
   wherein the pedal assembly is provided with a holding member for engaging with the locking portion;
   wherein the pedal assembly comprises a pedal body and a pedal bracket connected to the pedal body, the holding member is arranged on the pedal bracket; and
   wherein the connecting portion comprises a pulling rod and a first rotating assembly, the first rotating assembly is connected to the pedal bracket, one end of the pulling rod is adjustably connected to the first rotating assembly and the other end is connected to the attachment.

2. The garden tool system according to claim 1, wherein the pedal bracket is provided with a U-shaped arm at one end away from the pedal body, the first rotating assembly is connected to the U-shaped arm.

3. The garden tool system according to claim 2, wherein the first rotating assembly comprises two first pressing plate assemblies and a first rotating shaft rotatably assembled between the two first pressing plate assemblies, one end of the pulling rod is rotatably connected to the attachment, and the other end of the pulling rod penetrates through the first rotating shaft.

4. The garden tool system according to claim 1, wherein the locking portion is provided with a holding protrusion for engaging with the lifting device.

5. The garden tool system according to claim 4, wherein the holding protrusion and the locking portion are integrally formed.

6. The garden tool system according to claim 1, wherein the locking portion is provided with a toggle structure for separating the locking portion from the lifting device.

7. The garden tool system according to claim 6, wherein the locking mechanism further comprises a reset mechanism, two ends of the reset mechanism connected to the fixing portion and the locking portion respectively.

8. The garden tool system according to claim 7, wherein the locking portion is located beside the pedal assembly, and the toggle structure is formed by the one end of the locking portion away from the fixing portion and the toggle structure extends toward the pedal assembly.

9. The garden tool system according to claim 8, wherein the toggle structure extends beyond the upper surface of the pedal body.

10. The garden tool system according to claim 7, wherein the fixing portion and the locking portion are both provided with a positioning protrusion, two ends of the reset mechanism connected to the positioning protrusion disposed on the fixing portion and the locking portion respectively.

11. The garden tool system according to claim 10, wherein the reset mechanism is a reset spring.

12. The garden tool system according to claim 1, wherein the adjusting device further comprises an assisting mechanism, the assisting mechanism is provided with a retaining portion and a boosting portion, one end of the boosting portion is connected to the retaining portion, and the other end of the boosting portion is connected to the attachment.

13. The garden tool system according to claim 12, wherein the boosting portion comprises a linking rod and an elastic booster connected to the linking rod, the linking rod is adjustable connected to the retaining portion.

14. The garden tool system according to claim 13, wherein the retaining portion comprises two second pressing plate assemblies and a second rotating shaft rotatably secured between the two second pressing plate assemblies, one end of the boosting portion connects to the second rotating shaft, and the other end of the boosting portion connects to the attachment.

15. A garden tool, comprising:
a frame;
an attachment pivotally connected to the frame, the attachment having a first position and a second position; and
an adjusting device located between the garden tool and the attachment and connected to the frame and the attachment, including
a lifting device connected to the attachment, operative to adjust the position of the attachment; and
a locking mechanism including:
a fixing portion connected to the garden tool; and
a locking portion, rotatably connected with the fixing portion;
wherein the locking portion is engaging with the lifting device when the attachment is in the first position;
wherein the lifting device comprises a pedal assembly rotatably connected to the attachment, and a connecting portion connected to the pedal assembly and the attachment;
wherein the pedal assembly is provided with a holding member for engaging with the locking portion;
wherein the pedal assembly comprises a pedal body and a pedal bracket connected to the pedal body, the holding member is arranged on the pedal bracket; and
wherein the connecting portion comprises a pulling rod and a first rotating assembly, the first rotating assembly is connected to the pedal bracket, one end of the pulling rod is adjustably connected to the first rotating assembly and the other end is connected to the attachment.

16. An adjusting device of a garden tool, comprising:
a fixing portion connected to the garden tool;
a locking portion rotatably connected with the fixing portion; and
a lifting device connected to the garden tool, the lifting device having a locking position and a free position;
wherein the lifting device engages with the locking portion when the lifting device is in the locking position;
wherein the lifting device comprises a pedal assembly rotatably connected to the attachment, and a connecting portion connected to the pedal assembly and the attachment;
wherein the pedal assembly is provided with a holding member for engaging with the locking portion;
wherein the pedal assembly comprises a pedal body and a pedal bracket connected to the pedal body, the holding member is arranged on the pedal bracket; and
wherein the connecting portion comprises a pulling rod and a first rotating assembly, the first rotating assembly is connected to the pedal bracket, one end of the pulling rod is adjustably connected to the first rotating assembly and the other end is connected to the attachment.

* * * * *